April 16, 1940.  E. H. PIRON  2,197,081
MOTOR SUPPORT
Filed June 14, 1937   2 Sheets-Sheet 1

INVENTOR.
Emil H. Piron
BY
Johnson Davis
ATTORNEY.

April 16, 1940.                E. H. PIRON                2,197,081
                              MOTOR SUPPORT
                          Filed June 14, 1937        2 Sheets-Sheet 2
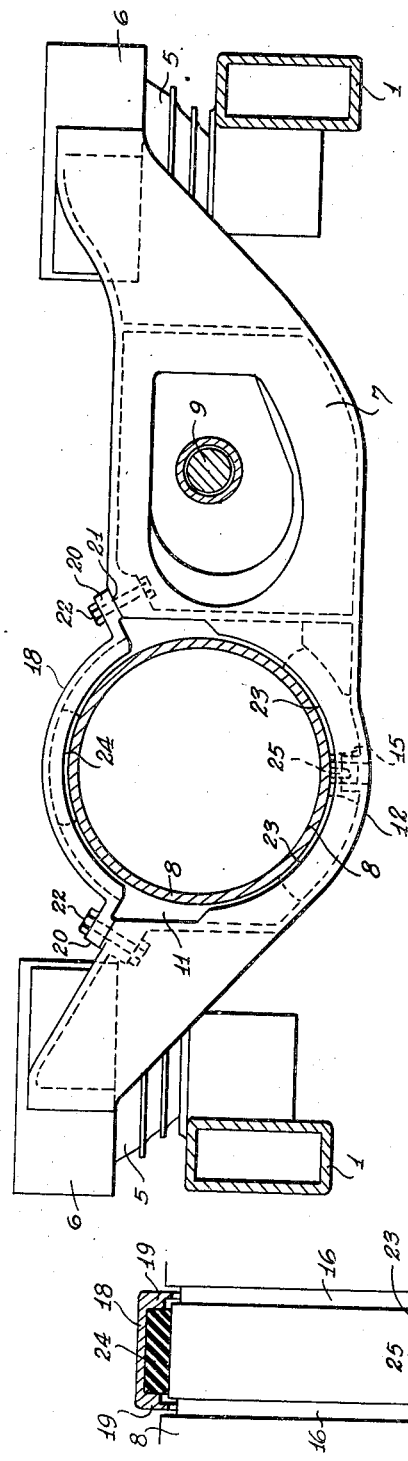
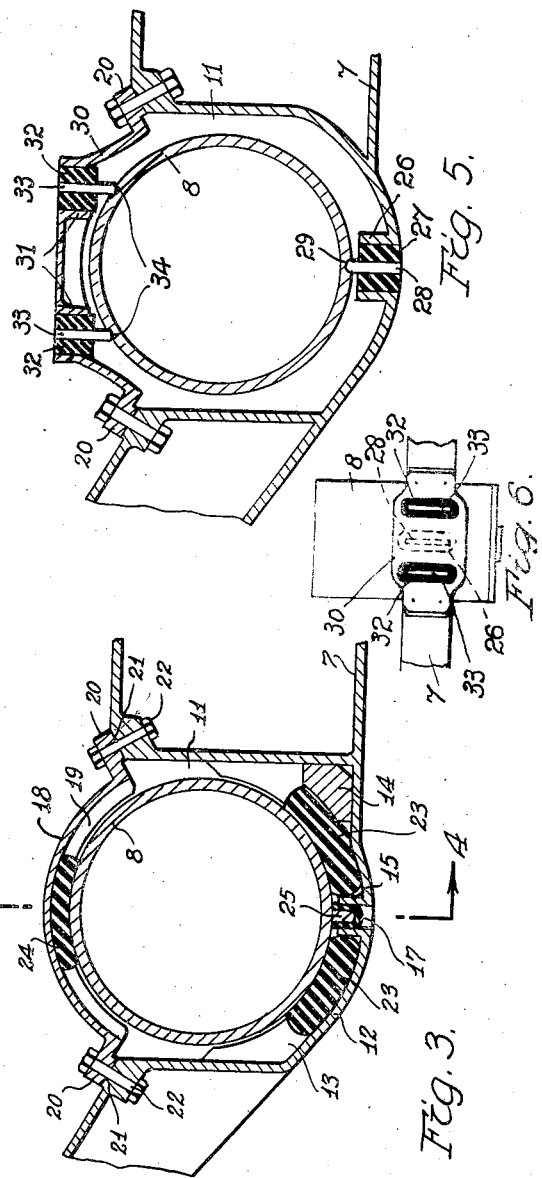
EMIL H. PIRON
INVENTOR.
BY
ATTORNEY.

Patented Apr. 16, 1940

2,197,081

UNITED STATES PATENT OFFICE 2,197,081

MOTOR SUPPORT

Emil H. Piron, New York, N. Y., assignor to Transit Research Corporation, New York, N. Y., a corporation of New York Application June 14, 1937, Serial No. 148,050

4 Claims. (Cl. 248—7)

This invention relates to the mounting in the trucks, frames or similar structures, of electrically or mechanically driven vehicles such as street cars, railroad cars, buses, etc., wherein more or less high speed rotary mechanisms such as electric motors or motor driven transmission mechanisms are employed, more particularly where such motors or mechanisms are characterized by more or less cylindrical casings within which elements rotate at and are of a weight or nature tending to produce mechanical vibrations of relatively high frequency. Such vibrations when transmitted through the frame or truck to the vehicle may find resonant response, or be so amplified, or be so intense in themselves, as to be highly objectionable for many obvious reasons which it is not deemed necessary to explain in detail.

A principal object of the said invention is, therefore, to obviate or minimize the conducting of such vibration to the frame or structure referred to, and contemplates the provision of strategically situated shock-absorbing resilient cushioning means about the casing of the motors or mechanism and incorporated in or carried by a suitable cross frame member.

More particularly, in an acceptable embodiment of the invention, it is proposed to provide the truck or frame structure with a motor support in the form of a cross member provided with an arcuate cradle portion lined or partially lined with a pad or pads of rubber or other suitable resilient material, on which pads the cylindrical casing of the motor, intermediate its length, is set; and an arcuate saddle similarly lined with resilient cushioning or vibration damping means and adapted to be bolted or otherwise secured to the said cross member and about the uppermost portion of the said motor casing in such manner that its securing will result in compression of all the resilient pads, whereby the said pads will directly function in the positioning and securing in position of the motor in the said cross member. In other words, security of mounting and damping and absorbing the motor vibration is sought by the cooperative effect of a shock-absorbing cradle structure and a shock-absorbing saddle structure.

A further object of the invention is to provide, at a series of salient points about the periphery of the motor, resilient supporting means responsive to longitudinal, radial and rotary vibratory motion which may be set up in the motor.

An additional object of the construction proposed is to provide for a security and a rigidity in the attachment of the saddle to the main body of the motor supporting cross member, that any tendency to displacement of the saddle member by vibration or stresses set up in use will be resisted to a high degree.

Other objects and advantages will become hereinafter more fully apparent from the description and illustrations of the example of an application of my invention shown in the accompanying drawings, wherein:

Figure 2 is a cross-sectional view of the same taken on the line 2—2, Figure 1;

Figure 3 is a sectional detail view of one of the motors and adjacent parts of its support taken on the line 3—3, Figure 1;

Figure 4 is a detail cross-sectional view of the cradle and saddle taken on the line 4—4, Figure 3.

Figure 5 is a similar view of Figure 3 of a modified form of the construction; and Figure 6 is a somewhat diagrammatic plan of the arrangement shown in Figure 5.

Similar characters of reference indicate similar parts in the several figures of the drawings.

Figure 1:
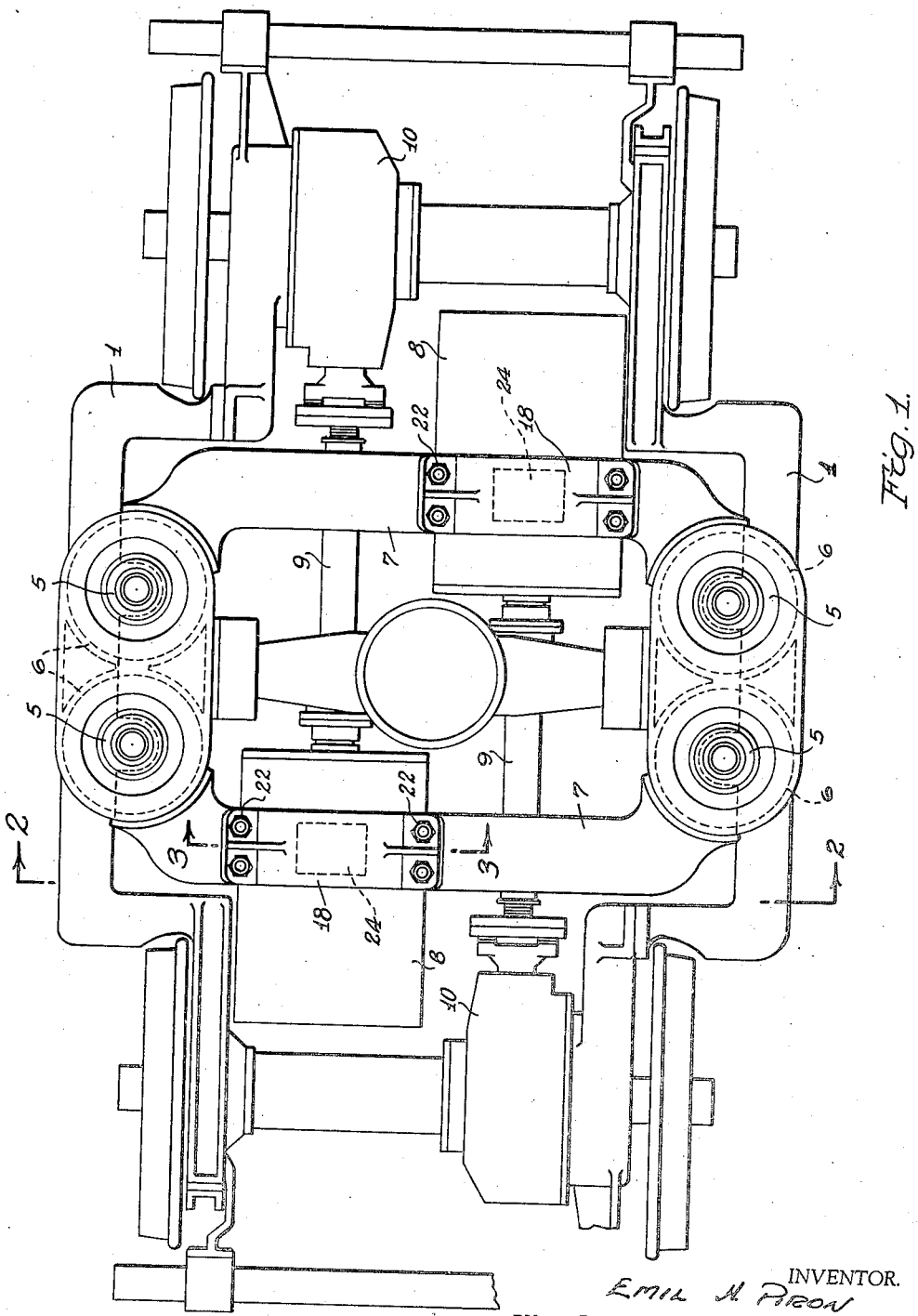
Figure 1 is a plan view of a truck embodying motor supports of the improved type.

In the illustrated example, a truck is shown having side frame members 1, the particular construction of which is not material to this application, the said frame members being equipped with springs 5 which are housed in casings 6. 7 are cross members, the ends of which are suitably connected to or may be integral with said casings, whereby the said cross members are, in this example, supported by the said springs from the frame of the truck. Other methods of mounting the cross members in the truck structure may be employed among the many available although the general arrangement illustrated is very desirable.

8 indicates the motors, 9 drive shafts, and 10 the transmission casings, simply illustrated to show a more or less standard propulsion system in an electric motor driven truck.

Each cross member 7 is shown as being interrupted in its length by a cut-away portion or deep recess 11 bounded at the bottom by an arcuate cradle 12 of channel cross-section having side walls 13, part of the arcuate cradle being formed by a corner block 14 set in one end of the channel as a matter of construction expediency. Projecting into said cradle at any suitable point, preferably at the lowermost point thereof, is a tubular boss 15.

The casing of the motor 8 is annularly recessed at 16 to an extent clearing the marginal portions of the side walls 13 of the saddle and cradle, so that slight motion of the motor radially and endwise will not cause undesirable contact between the motor casing and the said cradle or saddle. Extending from the said motor casing into the tubular boss 15 is a stop or projection 25 shown as being enclosed in a cap or covering 17 of rubber or other suitable resilient material, which may, of course, be equally well described as forming a resilient lining within the said tubular boss.

18 is an arcuate saddle of channel cross-section having side walls 19 and provided at each end with upwardly inclined lugs 20, which lugs are adapted to engage similarly inclined seats 21 formed on the cross member adjacent the recess 11. This inclined seating of the ends of the saddle enables the said seats 21 to assist in resisting lateral displacement of the saddle when in position, and the securing bolts 22 passing through the said lugs and seats are accordingly inclined towards a point above the saddle, whereby some further security is gained in that both lateral and vertical forces tending to displace the said saddle are applied at an angle to the axes of the said bolts, instead of directly tending to withdraw the bolts from the frame so far as the vertical force is concerned, as would be the case were the bolts arranged vertical and parallel to each other. The converging disposition of the said bolts also tends to lock the saddle in position irrespective of the securing of the said bolts by the nuts provided for that purpose, as it will be apparent that the removal of the saddle must be preceded by the withdrawal of the bolts and cannot be coincident therewith.

Within the channel of the cradle 12 and on either side of the said boss 15 are shown pads or blocks 23 of rubber or other suitable resilient material of a thickness requiring their compression to properly accommodate the motor in the cradle in the manner intended, and in the channel of the saddle is a similar pad or block 24 of rubber or other suitable material also of a thickness calling for its compression between the saddle and the motor casing to permit the bolting down in position of the said saddle over the motor casing. In the construction described, in assembling the motor in the casing, sufficient pressure is brought to bear on the saddle in any convenient manner to effect the required compression of the pads 23 and 24 and the engagement of the lugs 20 with the seats 21 of the cross member, whereupon the bolts 22 are then inserted in position and secured.

It will be seen that the edges of the pads 23 and 24 are not closely confined so that the said pads are free to spread under compression where the nature or structure of the pads is such that this spreading is essential to or characteristic of its compression.

It will be understood that although the member 7 is referred to as a cross member it is not necessarily required that it extend from one side of the frame to the other, as it is readily conceivable that it may extend in any required direction and be mounted directly or indirectly in the frame as convenience may dictate.

However, the invention may be extended to include in combination with the hereinbefore described resilient cradling of the motor, the connecting of the ends of the cross member 7 to sprung members such as the casings 6 of the springs 5 whereby the said cross members are sprung from the frame.

The resilient pads extending around or partially around the curved surface of the motor casing, and the rigid saddle and cradle backing the said pads in a similarly curved manner offer effective resilient resistance to motion of motor casing so that vibration damping in all directions is obtained with a high degree of support, protection of the pads and efficient support of the motor in the cross member.

The side walls 19 and 13 of the saddle and cradle extending in spaced relation into the annular recess 16 of the motor casing will, under extraordinary circumstances, definitely limit endwise movement of the motor in its support, but such circumstances would be very unlikely to occur as the stop 25 is primarily the positioning means for the motor by virtue of its engagement in the tubular boss 15 of the cradle.

The arrangement of resilient or elastic cushioning or vibration damping pads illustrated in Figures 1 to 4 has the characteristic that the pads offer a shear resistance to rotational movement of the motor casing and a compressive resistance to radial movement of the motor casing in the direction of any of the pads, but such an arrangement may be departed from as is indicated in Figs. 5 and 6 wherein such radial movements are resisted by rubber or similar pads in shear and the rotary movement by compression, or a combination of both shear and compression according to the dimensions and situation of the elements.

In said Figures 5 and 6 it will be observed that the base of the cradle is provided with an elongated boss 26 inclosing a rubber or similar bushing 27 which in turn supports a plate 28 the upper edge of which projects above the said bushing and enters a corresponding groove 29 in the underside of the motor casing whereby the said plate extends in the direction of the length of the said motor casing. The rubber is, of course, bonded or otherwise secured to contacting surfaces of the said boss and plate.

Similarly the saddle 30 is provided with bosses 31, preferably vertical to facilitate assembly of the device, these bosses also enclosing rubber housings 32 in which are centrally located vertical plates 33 the lower ends of which project below the said rubber bushings and engage in corresponding grooves 34 in the motor casing. Thus vertical movement of the motor casing, whether actual or general, will be resisted in shear by the said elastic bushings as distinguished from the compression resistance offered to such movement by the pads of Figures 1 to 4.

In the described assembly, the motor is solely supported intermediate its length in a resilient mounting permitting slight movement not only in any direction lateral or endwise but also angularly about a point within the support whereby provision is made for absorption of all manner of vibratory motion, whether originating in the motor or in its connections. Thus, if desired, the motor and its immediate connections may be more or less balanced as to weight distribution in the said support.

This invention may be developed within the scope of the following claims without departing from the spirit thereof, and it is desired that the foregoing specification and drawings be read as being merely illustrative and not in a limiting sense, except as necessitated by art.

What I claim is:

1. In combination, a motor, a transverse supporting member, a cradle for said motor in said member, a mass of elastic material compressed between said motor and said cradle, a saddle extending over said motor above said cradle, a mass of elastic material compressed between said saddle and said motor, and resilient means opposing rotation of said motor.

2. In combination, a motor, a motor supporting member, a cradle of channel section for said motor in said member, resilient means within the channel of said cradle, a saddle securing said motor in said cradle against said resilient means, and co-acting means on said motor cradle and saddle for positively restricting endwise movement of said motor in the presence of excessive deflection of said resilient means.

3. In combination, a motor, a transverse supporting member, a rigid cradle for said motor in said member, a rigid saddle extending over the upper part of said motor, resilient means spacing said motor from said cradle and from said saddle, seats on said member inclined toward a point within said cradle, end portions on said saddle inclined in counter-part of said seats, and means rigidly securing said end portions on said seats whereby said saddle resists bending moments in said supporting member.

4. In combination, a motor supporting member, a motor, an encircling structure in said member solely supporting said motor intermediate the length of said motor, resilient pads within said encircling structure spacing said motor therefrom, means for positively restricting rotative movement of said motor, and means for positively restricting endwise movement of said motor.

EMIL H. PIRON.